United States Patent [19]

Cousino

[11] 4,421,059
[45] Dec. 20, 1983

[54] AUTOMATIC CAT FEEDER

[75] Inventor: Bernard A. Cousino, Fort Myers, Fla.

[73] Assignee: Cousino Corporation, Ft. Myers, Fla.

[21] Appl. No.: 332,660

[22] Filed: Dec. 21, 1981

[51] Int. Cl.³ .............................................. A01K 5/02
[52] U.S. Cl. ............................................... 119/51.12
[58] Field of Search .............. 119/51.12, 51.13, 51.14, 119/51.15, 51.11

[56] References Cited

U.S. PATENT DOCUMENTS

| | | | |
|---|---|---|---|
| 3,900,007 | 8/1975 | Smith | 119/51.13 |
| 3,946,702 | 3/1976 | Mazzini | 119/51.13 |
| 4,249,483 | 2/1981 | Sobky | 119/51.12 |

FOREIGN PATENT DOCUMENTS 1546638  5/1979  United Kingdom ............ 119/51.12

Primary Examiner—Jay N. Eskovitz
Attorney, Agent, or Firm—Emch, Schaffer & Schaub Co.

[57] ABSTRACT

An animal feeder, for example, a cat feeder is disclosed. The cat feeder includes a top which defines a plurality of spaced feed positions. A cover, having a feeding opening, overlies the top. The feeding opening is indexed sequentially with respect to the successive feed positions. A pair of tension springs are wound and rotate the cover upon release by a time actuated solenoid.

1 Claim, 11 Drawing Figures

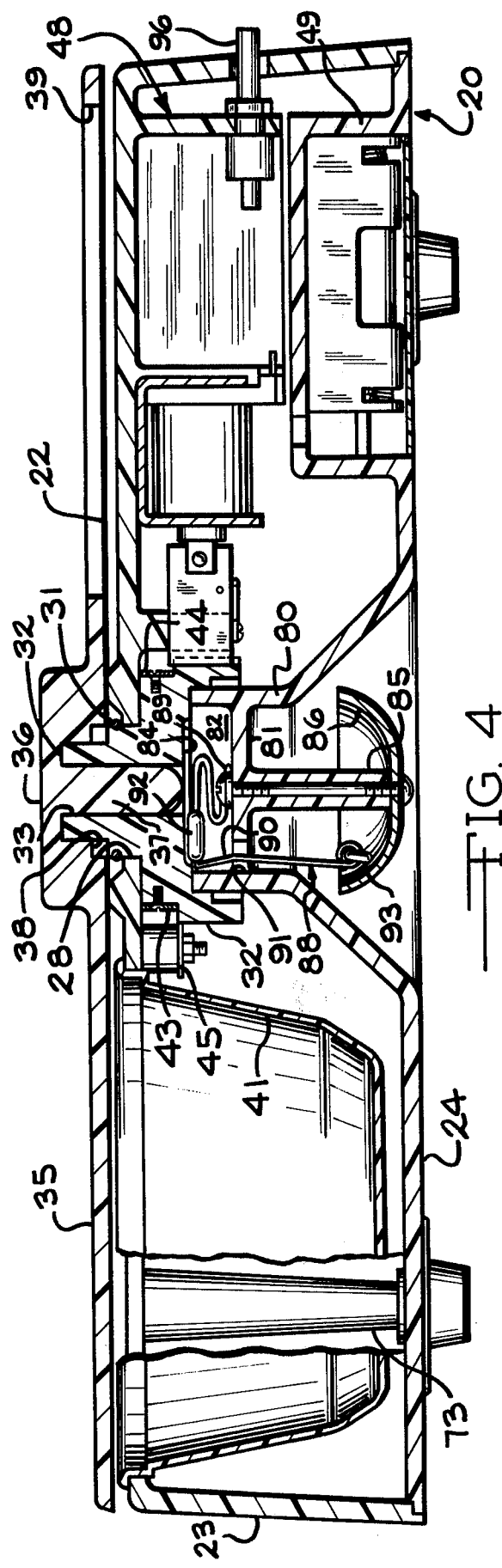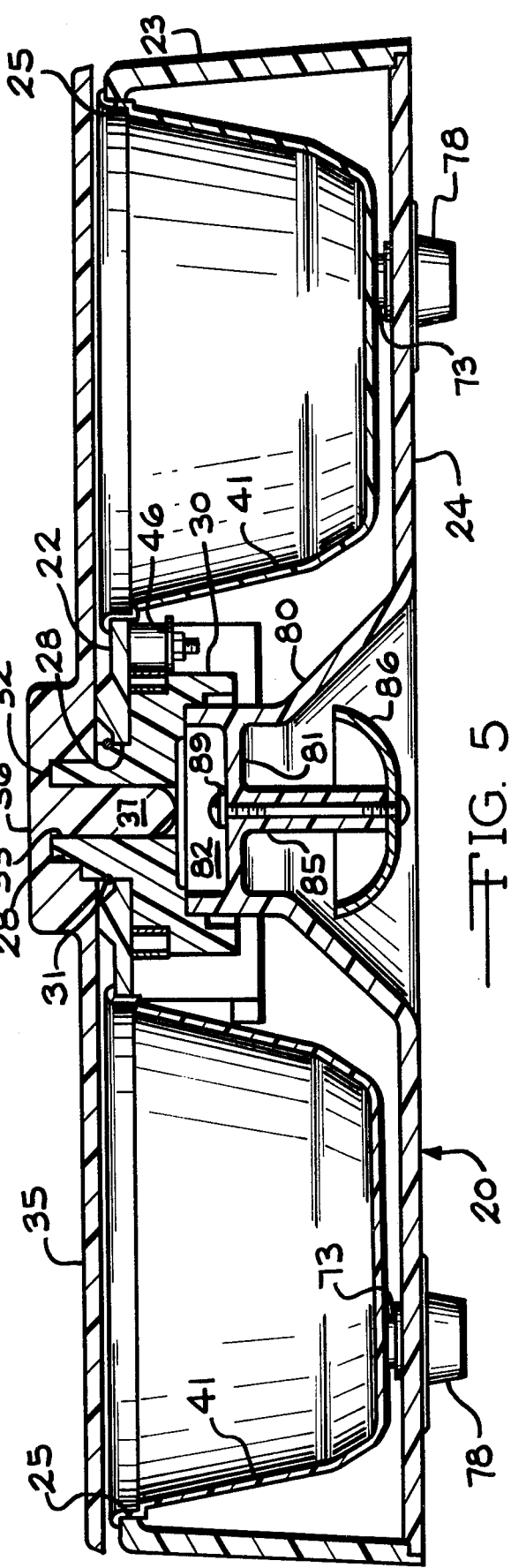

AUTOMATIC CAT FEEDER

This invention relates to an animal feeder and specifically to a three or four day "week-end" cat feeder. The feeder presents a variety of covered meals at controlled intervals. In one embodiment, three removable food cups are arranged in a circular manner along with one blank starting space. A removable cover disk of generally equal diameter fits snugly over the food cups and defines a single feed hole. Starting with the feed hole over the blank position, the food is made accessible at controlled intervals by rotation of the cover disk. The rotating means preferably includes a solenoid release that allows the spring biased cover to revolve and present a fresh meal at a desirable time.

BACKGROUND OF THE INVENTION

In the field of feeding pet cats, the present state of the art is limited in controlling proportions, variety, and exposure to food contamination. This limits the time that a pet owner can leave home without the expense and inconvenience of a rental cattery, or without imposing upon a friend or neighbor.

One type of prior art feeder is much like a minature silo. Dry food is stored in a plastic cylinder. A hole at the base allows the food to settle into a feed cup as food is consumed.

Another prior device provides one or two rectangular food storage boxes with a single hinged cover that is lifted by leverage when a cat steps upon a front platform.

Most prior devices fall short of feeding the cat its normal daily rations or diet variety. As well advertised on commercial cat labels, and in pet care books, the normal feeding for an adult cat is one cup per day. Providing a large supply of food and then having a cat alone to ration itself to a daily allowance is often unacceptable. Some cats indulge in an orgy of gluttonly, leaving none for later. Even catering for its greed by supplying too much food must inevitably result in leftovers that turn stale, are contaminated, or attract roaches and rodents. In any case, the health and well being of the household and the cat are bound to suffer.

The alternative of placing the cat in a cat boarding kennel or cattery presents another problem to the cat owner. Besides the inconvenience and cost, it is universally recognized by cat owners and published authorities on the subject that pet cats are greatly distressed when confronted with strange environments. The cat's instinct is to withdraw into itself. In some cases it would rather starve than eat, especially if the food is strange and unsuited to their customary diet.

Cats that have been home and apartment sheltered are subject to the additional hazard of exposure to disease in a public boarding cattery. Cats are much more content to be left in their familiar home environment.

SUMMARY OF THE INVENTION

The present invention relates to a device that solves the feeding problems of pet owners who desire the freedom of leaving home for several days with the assurance that their pet cat (or other pets of approximately the same size), will be properly fed during their absence.

In its basic form as described herein, the cat feeder consists of a cylindrical drum, approximately twelve inches in diameter and two inches high.

The circular top of the drum may be constructed with side walls projecting downwardly and with a bottom circular edge which is recessed and flanged in a manner to receive a formed bottom.

The circular top of the drum is provided with four circular positions. Three of the circular positions are open in a manner to receive and snugly hold the outer flange of a feed cup. The fourth position may be slightly indented in a manner to receive a round decal or instruction label. The fourth position is normally the start position.

A circular hole is centered at the top of the drum and provides a bearing surface for a drive shaft protruding upwardly from the drive ring.

Three feed cups are placed into the three circular holes defined by the drum top. A circular top cover with a single feed hole is provided to cover the entire drum top. The cover disk is provided with an upper knob and a downward protruding flange to engage a flange of the drive shaft.

As the drive shaft is revolved the top cover with the single feed hole rotates to expose one feeding at a time at controlled intervals.

The timed indexing of the revolving top cover with the single "feeding hole" is controlled by a drive ring fastened to the drive shaft.

The drive ring mounts two constant tension springs in opposing alignment to provide the force required to revolve the top feed cover.

Ramps or stops on the drive ring serve as index points to align and hold the "feed hole" above the feed cups.

A solenoid with a moveable plunger is positioned adjacent to the ramped index stops in a manner to permit the plunger to "ride up" the ramps as the revolving top feed cover is rotated. Initially, the front vertical section of the ramp stop engages the solenoid plunger. This holds the feed cover at the "start" position so that all three feed cups remain covered until released in sequence at feeding time, normally every twenty-four hours. At the last station, the power circuit is opened until the unit is rewound.

Feeding intervals are controlled by a lifting impulse of the solenoid that allows the holding flange to clear the front vertical face of the "holding ramp". The lifting impulse is generated by means of a battery operated electronic timer circuit. At the proper time interval, the solenoid is energized.

Radial notches are provided on the drive ring and are designed to actuate a metal knocker that rings a "dinner bell" or other sounding device as the top cover revolves to expose a fresh meal.

ADVANTAGES OF THE INVENTION

It is clear that this method of portion, variety, and time controlled pet feeding can solve many problems for pet owners.

For example, with the basic format disclosed, other models can be offered to feed kittens that require two meals a day. The unit can be made with six one-half (½) cup feedings and timed for twelve (12) hours intervals, instead of the standard one cup a day for adult cats.

The pet owner who desires to extend the feedings to four days could use the standard three (3) day unit and provide the first day feeding in the cat's regular one day feeding dish and the feeder can be set to provide the next three meals at twenty-four (24) hour intervals.

Some pet owners like to feed their cat a "wet" canned food meal at least once a day for variety. In that case, the canned food can be placed in a feed cup with a snap-on plastic cover and frozen. On the day of departure, the frozen food is placed in the "first-meal" position so that 24 hours later the food has reached room temperature and is still fresh for the cat's first meal. The other two dry food means will follow in sequence.

Another advantage of this invention is that any meal unconsumed one day will be covered up automatically when a fresh meal is exposed for the following day.

Some pet owners may elect to make use of the automatic feeding feature even if they are home, thereby avoiding the daily chore of remembering to feed the cat.

The fact that energy is stored in the constant tension springs by the act of winding the feed cover into the start position, makes it possible to use safe and long lasting dry cell batteries. The only electrical energy required is one impulse a day to activate the release solenoid. Therefore, the cat feeder does not require a wall outlet for power and the feeder can be placed in any room in the home without fear of fire hazard or electrical shock to the pet.

DETAILED DESCRIPTION OF THE DRAWINGS

FIG. 4 is a cross sectional view taken along the line 4—4 of FIG. 1 and shown on an enlarged scale;

FIG. 5 is a view, similar to FIG. 4, taken along the line 5—5 of FIG. 1;

DETAILED DESCRIPTION OF THE PREFERRED EMBODIMENT

Figure 1:
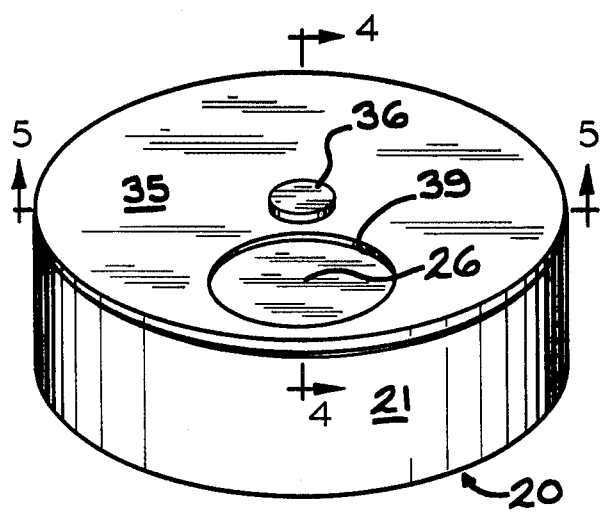
FIG. 1 is a perspective view showing a cat feeder, according to the present invention.

An animal feeder, more particularly, an automatic cat feeder, is generally indicated in FIG. 1 by the reference number 20. The cat feeder 20 includes a cylindrical drum 21 having a circular top 22, a side wall 23 and a bottom 24. The circular top 22, of FIG. 3, contains a plurality of openings 25 and a blank position 26, which is defined by a dotted line in FIG. 2. In the present embodiment the cover contains three (3) openings and a blank position which are spaced 90° apart. Normally, a circular instruction label or a product logo (not shown) is attached to the circular top at the blank position 26.

Referring to FIGS. 4 and 5, the top 22 defines a central opening 28. A drive ring 30 is rotatably mounted within the opening 28 by a snap ring 31. The drive ring 30 includes an upwardly extending, notched collar 32 having a central bore 33.

A cover 35 which defines a knob 36 and a downwardly depending spindle 37 is mounted for rotation with the drive ring 30. The knob 36 defines a recessed interior surface 38 which mates with the notched collar 32. The spindle 37 is received by the central bore 33 of the drive ring 30.

The cover 35 defines a feed opening 39 having a diameter complementary with the openings 25 in the top 22 of the drum 21.

Removable feed cups 41 are positioned within the openings 25. As will be discussed below, the cover 35 is sequentially rotated, moving the feed opening 39 from the start or blank position 26 to each of the feed cups 41 at predetermined intervals.

Figure 3:
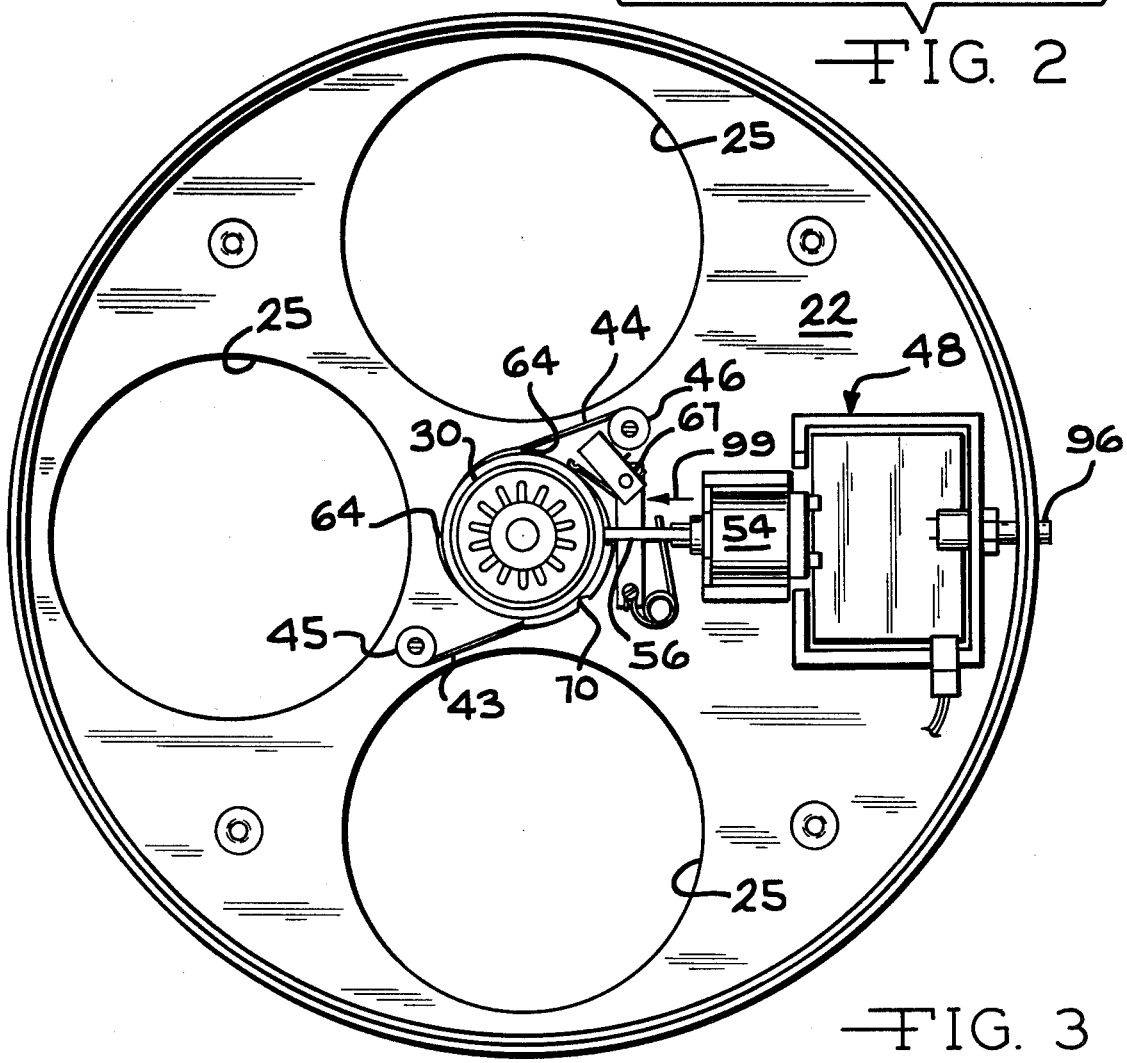
FIG. 3 is a bottom view of the top showing in particular the spring drive mechanism and the solenoid stepping mechanism.
Figure 7:
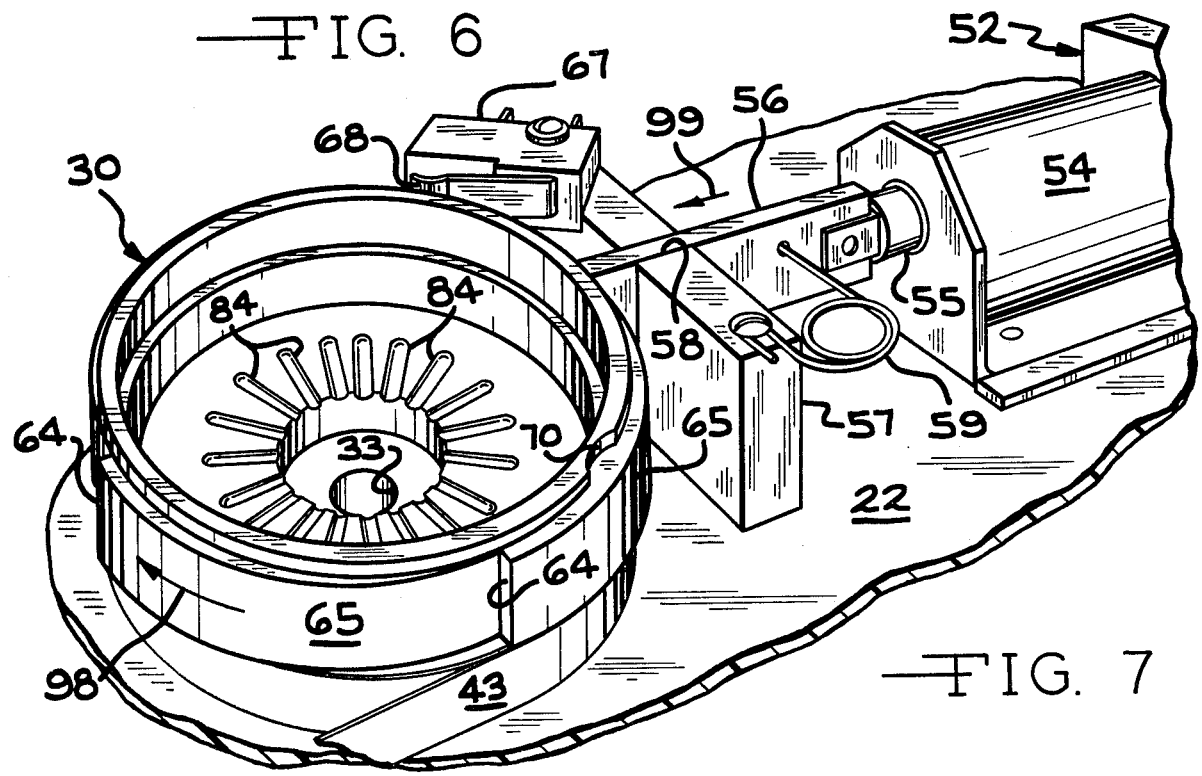
FIG. 7 is a view similar to FIG. 6 and showing the relationship between the stepper mechanism and the drive ring.

Constant tension springs 43 and 44 have their opposing inner ends attached to the drive ring 30 with their coils free to wind and unwind around the drive ring 30. The opposing outer ends of tension springs 43 and 44 engage posts 45 and 46 which depend from the top of drum 21 as best shown in FIGS. 3 and 7. Upon actuation of the drive ring 30, cover 35 rotates counterclockwise to sequentially expose feed cups 41 at timed intervals, as shown in FIG. 3.

Figure 8:
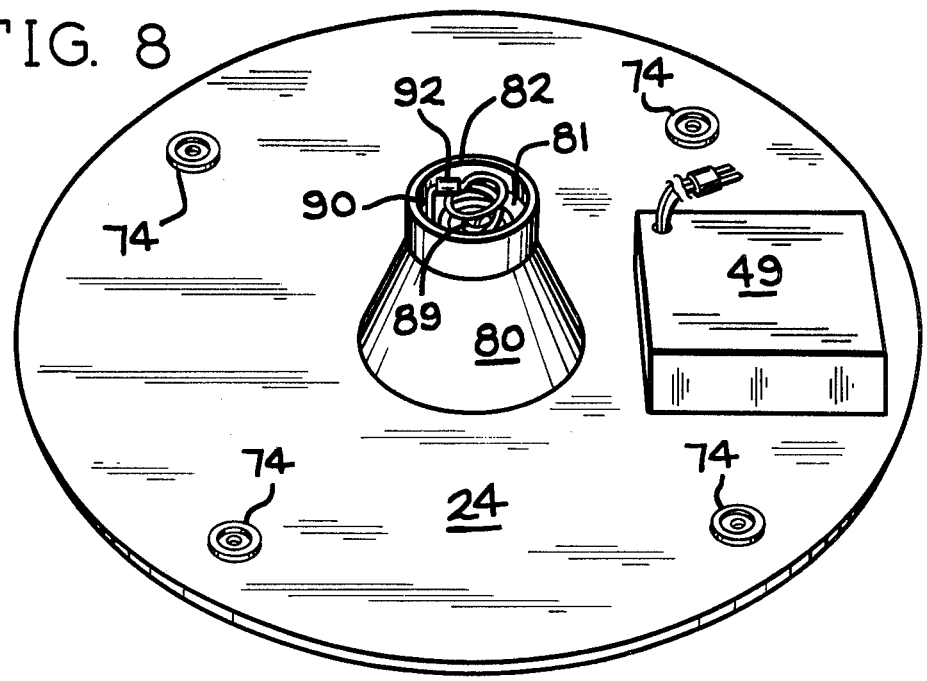
FIG. 8 is a top view of the bottom plate of the cat feeder.
Figure 9:
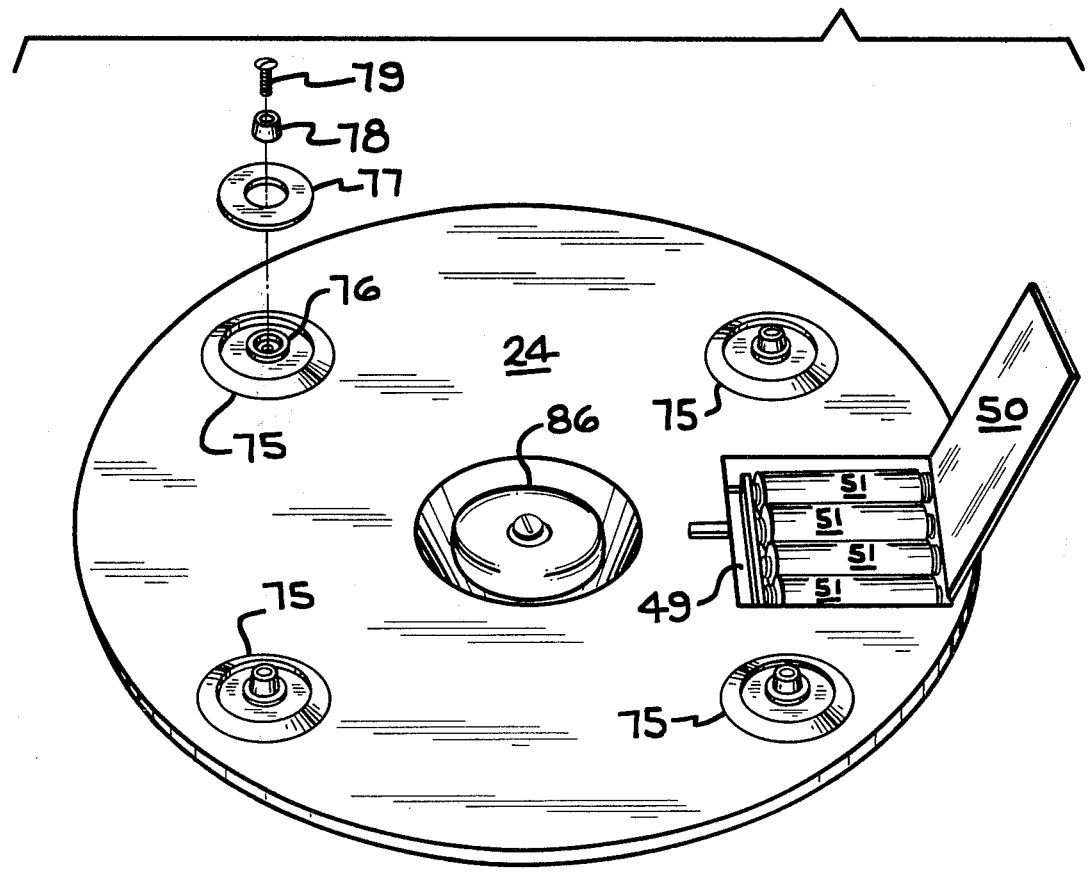
FIG. 9 is a bottom view of the bottom plate of the cat feeder.

Referring to FIGS. 3 and 4, a control housing 48 is molded on the underside of the top 22 of the drum 21. The control housing 48 is in electrical communication with a battery housing 49 which is molded on the upper side of the bottom 24 as best shown in FIGS. 8 and 9. The battery housing 49 includes a lid 50 which provides access to a plurality of dry cell batteries 51.

Figure 6:
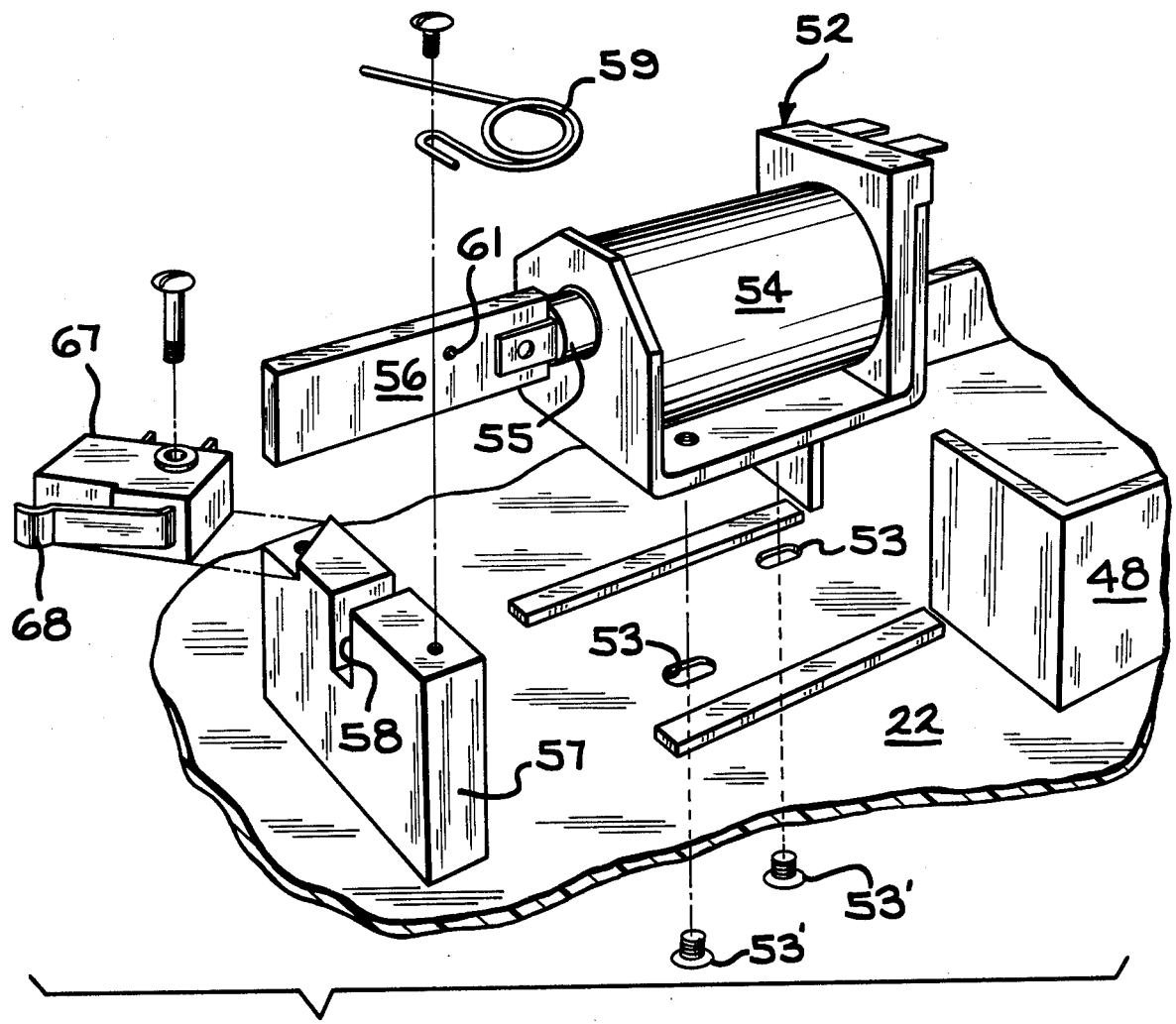
FIG. 6 is a fragmentary, exploded view showing the solenoid stepper mechanism.

Referring to FIGS. 6 and 7, a solenoid assembly 52 has a plunger 55 which mounts a plunger arm 56. The solenoid assembly 52 is guide mounted to the under side of top 22 of the drum 21 by screws 53' inserted through oval guide slots 53. This provides for micro adjustment of the plunger arm 56 in relation to the stop shoulders 64 on drive ring 30.

A guide block 57 having a guide slot 58 is molded onto the underside of top 22 of drum 21 adjacent the drive ring 30. A light coil spring 59 (FIGS. 6 and 7) is fastened to an upper end of the guide block 57 with the free end protruding through a small hole 61 in plunger arm 56 thus providing an outward torque as shown by arrow 99 in FIGS. 3 and 7, to insure the plunger arm 56 is fully extended into engaging relationship with the stop shoulders 64a, b, c and d, as shown in FIG. 10.

Figure 10:
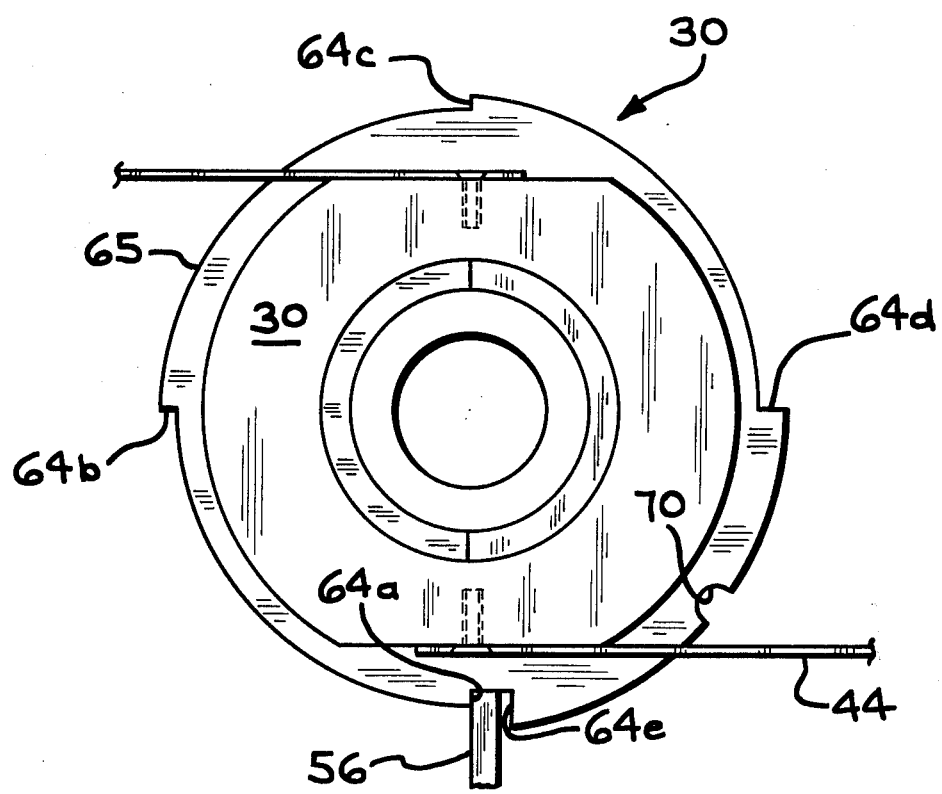
FIG. 10 is a top view of the drive ring mechanism.

Referring to FIG. 10 as the top view of drive ring 30, a plurality of equally spaced vertical stop shoulders 64a, b, c, and d are shown on the exterior circumference of the drive ring 30 in an engaging relationship with the plunger arm 56 of the solenoid assembly 52. The stop shoulders a, b, c, and d are equally spaced in this particular embodiment being 90 degrees removed from one another. The starting slot formed between stop 64a and 64e is slightly larger than the thickness of plunger arm 56 to prevent binding on the first feeding release by solenoid 52.

In FIG. 10, ramped walls 65 are provided between stop shoulders a and b, b and c, and c and d. The ramped walls are tapered from behind the base of each stop shoulder with the taper diminishing at the base each adjacent stop shoulder.

The quandrant between stop shoulder 64d and stop 64e of FIG. 10 is not tapered and is thicker in outer diameter to provide positive stops approximately two times as deep as stop shoulders a, b, and c. When the solenoid 54 is activated the front vertical edge of the plunger arm 56 is adjusted to clear the highest edges of the stop shoulders 64a, b, and c, by means of the two micro slot adjustments 53 shown in FIG. 6. The plunger arm 56 cannot then by-pass the deeper shoulder stops at 64d and 64e. The higher stop at 64d prevents overdrive of the feed cover 35 at the third and last feeding position and also insures that the rewinding operation can be done in a clockwise direction only. Upon rewinding, the higher stop shoulder 64e will cause the cover 35 to stop automatically at the feed START position over the blank position 26 when the plunger arm 56 reaches the shoulder 64e.

In operation, the springs 43 and 44, upon winding by rotation of the knob 36, urge the drive ring 30 in the direction of rotation indicated by the arrow 98 in FIG. 7. Engagement of the end of the plunger 56 against one of the stops 64 holds the drive ring 30 and the cover 35 of the cat feeder 20 in a stationary position. Upon activation of the solenoid 54, the plunger arm 56 acts against the spring tension of coil spring 59 and is moved away from the respective stop 64 and the drive ring 30 is free to rotate until the plunger arm 56 engages the next successive stop 64.

A micro-switch 67 having an actuator blade 68 is mounted on the guide block 57 adjacent the outer periphery of the drive ring 30. An upper edge of the drive ring 30 defines a switch recess 70. When the last meal is served from the last feed cup 41, the actuator blade 68 is received in the recess 70. This opens the circuit to the batteries 51, which prevents a power drain on the batteries 51. Rewinding of the drive ring 30 moves the actuator blade 68 from the switch recess 70 thereby closing the power circuit.

Referring to FIG. 4, a series of leg posts 73 are integrally molded, in the present embodiment, downward from the underside of top 22 of the drum 21. Referring to FIG. 8, a plurality of integral circular flanges 74 are defined in the top surface of the bottom 24 to receive the four leg posts 73. Referring to FIG. 9, the reverse side of the bottom 24, or the bottom side, defines a plurality of raised ridges 75 together with molded center rings 76. In the present embodiment, a washer 77 having an outer sticky surface surrounds the center ring 76. The sticky surface serves as an insect barrier to reduce the risk of food contamination. A plastic or rubber foot 78 is positioned within the center ring 76 and is attached by a screw 79 which extends through the bottom 24 of the cat feeder 20 to engage a respective leg post 73.

In the present embodiment, a generally truncated housing 80 extends upwardly from the bottom 24. A circular wall 81 is positioned within the housing 80 and defines a chamber 82. A series of radial notches 84 are defined by the lower surface of the drive ring 30 (see FIG. 7). As seen in FIGS. 4 and 5, the notches 84 are immediately above the chamber 82. A post 85 extends downwardly from the wall 81 and mounts a bell 86 adjacent its end. A clapper assembly 88 is attached by a screw 89 adjacent the upper end of the post 85. The clapper assembly 88 includes a vibrating arm 90 which extends through an opening 91 defined by the circular wall 81. A follower 92 is mounted on the vibrating arm 90 and is complementary with the notches 84. As the drive ring 30 rotates movding the feed opening 39 to a position over a fresh feed cup 41, the notches 84 engage the follower 92 vibrating the arm 90 such that a striker 93 rings the bell 86.

Figure 11:
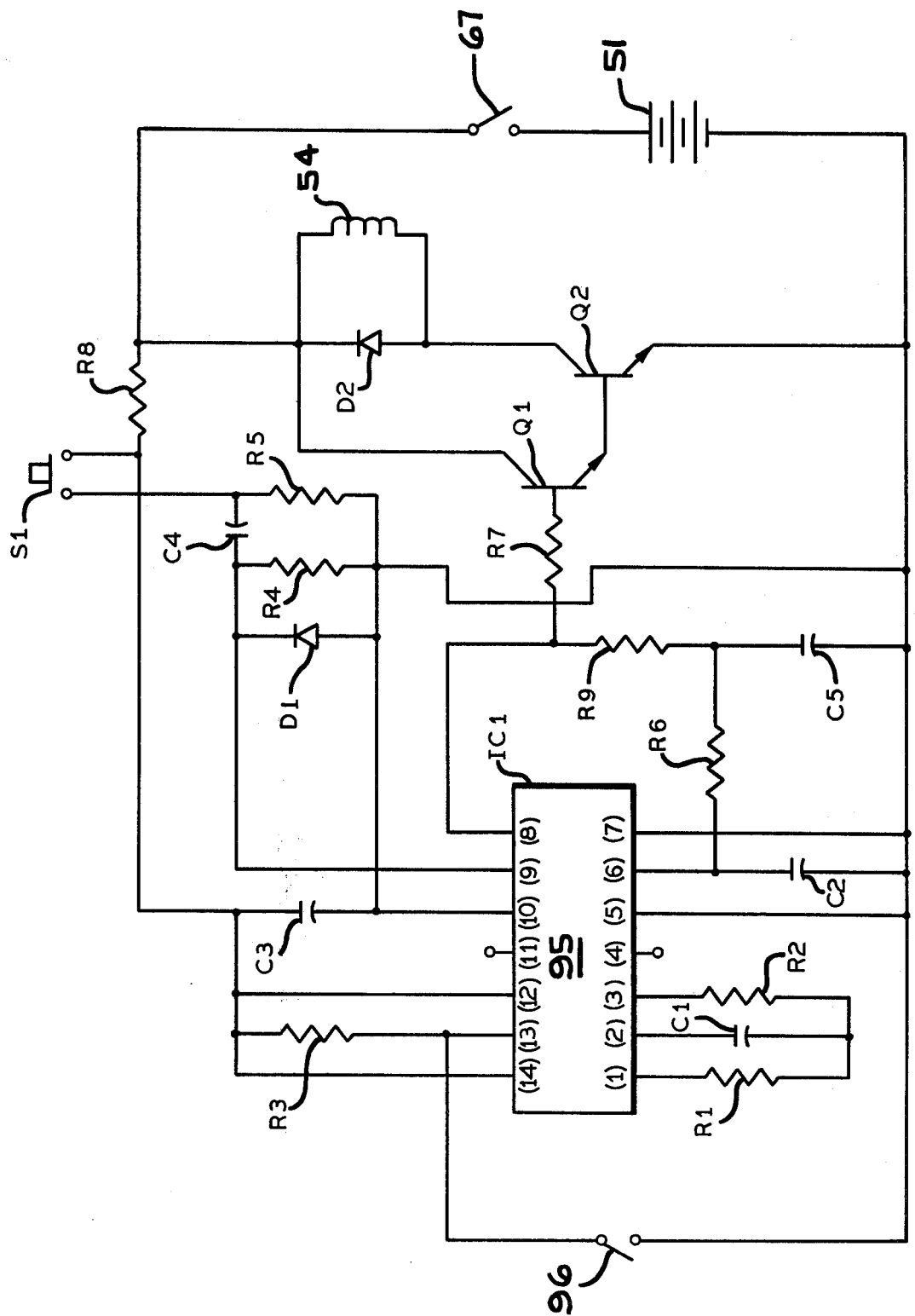
FIG. 11 is an electrical diagram showing the electrical circuitry of the cat feeder.

The control circuitry, as shown in FIG. 11, is generally located within the control housing 48 and includes the batteries 51 in housing 49, as shown in FIG. 4. The circuit includes a timer 95. The oscillator/timer 95 is known in the art and is sold by Motorola under the designation MC 14541 B. The basic oscillator frequency is controlled by $R_1$, $R_2$ and $C_1$. In the normal twenty-four (24) hour mode of the oscillator/timer 95 pulses 131,072 times. The present embodiment includes a fast mode switch 96 which is electrically connected to the pin (13) of the oscillator/timer 95. Upon closing of the switch 96, a fast mode circuit is energized with the pulse count being 256 rather than 131,072. This means that the actuation time will be 338 seconds (5 minutes and 38 seconds) rather than the 24 hours. The fast mode circuit allows testing of the feeder to determine if it is operating correctly in relation to a 24 hour time cycle. A fast check is received by pressing the test switch 96 as shown in FIG. 3.

Upon closing of the micro-switch 67, all count registers of the oscillator/timer 95 are set to zero because pin (5) is connected to ground, which provides for automatic reset on power up. The supply voltage to the oscillator/timer 95 is decoupled from the batteries 51 by the resistor $R_8$ and the electrolytic capacitor $C_3$. This decoupling assures stable counter reset switching when a heavy current pulse is drawn from the batteries 51 when energizing the winding of the solenoid 54.

When the timing cycle has reach the designated count, pin (8) turns on the Darlington transistor pair ($Q_1$, $Q_2$,) thereby powering the winding of the solenoid 54. The duration of this pulse is controlled by resistors $R_6$, $R_9$ and and capacitors $C_2$, $C_5$. After pin (8) goes high, $C_2$, $C_5$ charges through $R_6$, $R_9$, until the voltage reaches the trigger point of the gate on pin (6). At this point, the counters are reset to zero, pin (8) goes low and the cycle starts over. The "on" time of the solenoid is approximately sixty (60) milliseconds.

Manual triggering of the solenoid 54 may be achieved by engaging manual switch $S_1$. This pulls pin (9) high which complements the output level present on pin (8). The manual advance pulse duration is controlled by the charging of capacitor $C_4$ through resistor $R_4$. The output pin (8) will only go high as long as the charging current holds the pin (9) above the trigger voltage. This time constant is formed by resistor $R_4$ and capacitor $C_4$ and is approximately twenty (20) milliseconds. This pulse duration is less than the duration required for reset, therefore the timer is not reset upon manual advance. When the manual advance circuit opens, the charge on capacitor $C_4$ is discharged through diode $D_1$ and resistor $R_5$ to prevent a large negative voltage applied to pin (9) of the oscillator/timer 95. The batteries 51 used for the feeder 20 are normally alkaline batteries since they are best suited to deliver the high current pulses required by the solenoid 54. The maximum current drain on the batteries 51 during the timing cycles will not normally exceed 600 microamps, which will provide an exceptionally long battery life.

Figure 2:
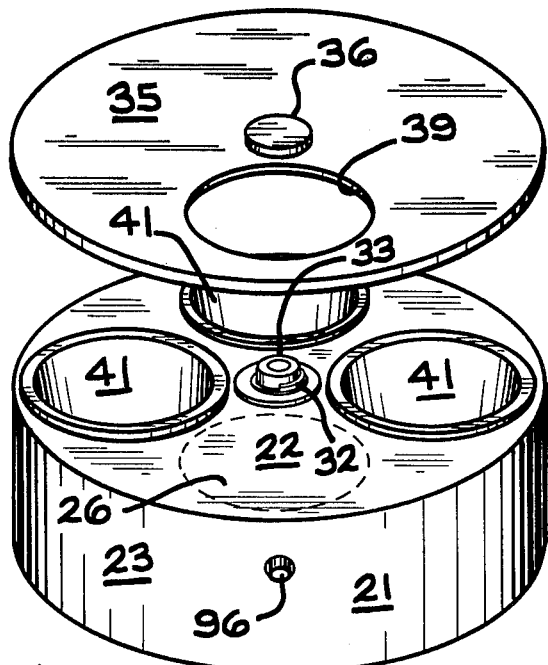
FIG. 2 is an exploded view showing the cover elevated from the remainder of the cat feeder.

In a normal sequence of operation, the cover 35 is removed from the cat feeder 20 as shown in FIG. 2. The feed cups 41 are filled with the desired food and placed in the openings 25 and the cover 35 repositioned such that the feed opening 39, after winding, is over the blank position 26. In this position the animal can not obtain access to the food. After the predetermined time has expired, in the present embodiment 24 hours, the solenoid 54 is actuated withdrawing the plunger arm 56 from the respective stop 64 and allowing the spring force to rotate the cover 35 one station or 90°. The feed opening 39 of the cover 35 is then over one of the feed cups 41. After each successive 24 hour interval, the above described process is again repeated until the last station is reached. When this occurs, the actuator blade 68 enters the switch recess 70 and the micro-switch 67 is opened thereby opening the circuit between the batteries 51 and the solenoid 54. At this time, the cover 35 may be removed, the feed cups 41 refilled, and the springs 43 and 44 rewound for the next feeding cycle.

It is apparent, that additional numbers of feed cups and other changes and modifications may be made without departing from the spirit and scope of the present invention and the following claims.

I claim:

1. A cat feeder, comprising, a housing having a top, said top defining a plurality of spaced feed positions, feed cups located at said spaced feed positions, a rotatable cover overlying such top and having a feed opening for indexing with one of said feed positions, a drive member connected to said cover for sequentially rotating said cover at predetermined time intervals, said drive member includes a plurality of radially spaced stops and said control means includes a solenoid assembly having a plunger arm which engages said stops, whereby actuation of said solenoid disengages said plunger arm from said stop allowing rotation of the drive member and the cover, spring means for rotating said drive member, said spring means comprise a pair of tension springs operatively connected to said drive member, control means for actuating said spring means, and said control means includes a timer for actuating said solenoid at predetermined time intervals, sound means operatively connected to said drive member whereby said sound is actuated upon rotation of said drive member and said cover, said control means includes a battery power supply, a switch assembly mounted adjacent said drive member and a switch actuator on said drive member for engagement with said switch assembly, whereby upon rotation of said cover to the last feed position, said switch actuator engages said switch assembly to open the electrical circuit to said battery power supply.

* * * * *